US006476858B1

(12) United States Patent
Ramirez Diaz et al.

(10) Patent No.: US 6,476,858 B1
(45) Date of Patent: Nov. 5, 2002

(54) VIDEO MONITORING AND SECURITY SYSTEM

(75) Inventors: Luis G. Ramirez Diaz, Carolina, PR (US); Pedro L. Cruz Burgos, Caguas, PR (US); Dan F. Rodriquez, Guaynabo, PR (US)

(73) Assignee: Innovation Institute, Caguas, PR (US)

( * ) Notice: Subject to any disclaimer, the term of this patent is extended or adjusted under 35 U.S.C. 154(b) by 0 days.

(21) Appl. No.: 09/372,944

(22) Filed: Aug. 12, 1999

(51) Int. Cl.[7] .................................................. H04N 7/18
(52) U.S. Cl. ........................ 348/159; 348/152; 348/153
(58) Field of Search ................................. 348/159, 152, 348/153, 154, 155, 143; 340/541; 382/204, 256, 257, 258, 259, 103, 111, 104

(56) References Cited

U.S. PATENT DOCUMENTS

| | | | | |
|---|---|---|---|---|
| 4,249,207 A | * | 2/1981 | Harman et al. ............. 348/152 |
| 4,876,597 A | | 10/1989 | Roy et al. .................... 358/141 |
| 4,962,473 A | * | 10/1990 | Crain .......................... 340/541 |
| 4,992,866 A | * | 2/1991 | Morgan ....................... 348/159 |
| 5,091,780 A | * | 2/1992 | Pomerleau .................. 348/152 |
| 5,333,208 A | * | 7/1994 | Massen ....................... 382/111 |
| 5,396,284 A | | 3/1995 | Freeman ..................... 348/154 |
| 5,467,402 A | * | 11/1995 | Okuyama et al. ........... 382/104 |
| 5,479,526 A | * | 12/1995 | Benton et al. ............... 382/103 |
| 5,581,297 A | | 12/1996 | Koz et al. .................... 348/152 |
| 5,583,796 A | * | 12/1996 | Reese .......................... 348/159 |
| 5,608,653 A | | 3/1997 | Palmer ................... 364/514 C |
| 5,619,183 A | | 4/1997 | Ziegra et al. ................ 340/505 |
| 5,625,410 A | * | 4/1997 | Washino et al. ............ 348/159 |
| 5,745,167 A | * | 4/1998 | Kageyu et al. ............. 348/159 |
| 5,798,798 A | | 8/1998 | Rector et al. ............... 348/476 |
| 5,818,935 A | | 10/1998 | Maa ............................. 380/20 |
| 5,831,669 A | * | 11/1998 | Adrain ........................ 348/143 |
| 5,847,760 A | | 12/1998 | Elmaliach et al. .......... 348/390 |
| 5,852,610 A | | 12/1998 | Olaniyan .................... 370/486 |
| 5,854,654 A | * | 12/1998 | Zwahlen et al. ............ 348/159 |
| 5,872,784 A | | 2/1999 | Rostoker et al. ............ 370/395 |
| 5,875,304 A | | 2/1999 | Winter et al. .......... 395/200.61 |
| 5,926,210 A | * | 7/1999 | Hackett et al. ............. 348/159 |
| 5,929,904 A | * | 7/1999 | Uchida ........................ 348/159 |
| 5,982,418 A | * | 11/1999 | Ely ............................. 348/159 |
| 6,097,429 A | * | 8/2000 | Seeley et al. ............... 348/154 |

* cited by examiner

*Primary Examiner*—Howard Britton
*Assistant Examiner*—Allen Wong
(74) *Attorney, Agent, or Firm*—Patent Law Offices of Heath W. Hoglund

(57) ABSTRACT

A computer-based system employing video capture, video motion detection, digital I/O and communications technology is applied to monitoring and security applications. Video information from one or more analog or digital cameras, is independently converted into digital form, optionally displayed in computer monitor on separate resizable windows, analyzed for motion and/or transmitted via the Internet or other networks. Motion detection or event triggers may be derived from a plurality of sources including analysis of digitized camera video signals, motion detector devices, signals from alarm systems, X10 motion sensors or cameras with built-in motion detection. Once a trigger event occurs, software compresses the digitized camera image, stores it in a local database, converts it to an Internet mail binary file format, and sends the file to the address of a recipient. Alternatively, a beeper or direct phone call may be sent in response to alarm condition. A remote monitoring feature allows the system user to monitor either database or live video images from a plurality of remote locations.

37 Claims, 11 Drawing Sheets

Figure 1

Video Sentinel Client
User Interface
showing 4 camera windows

Figure 2

Camera window components

Figure 3

Video Sentinel Client
User Interface
showing 16 camera windows

Figure 4

Camera view windows
resized by user

Figure 5

Windows resized by user and running another aplication such as a Word processor

Figure 6

Video Database
record viewing
window

VIDEO MONITORING AND SECURITY SYSTEM

FIELD OF THE INVENTION

This invention relates generally to security and control systems and, in particular, to a computerized video monitoring and security system based on a standard PC platform.

BACKGROUND OF THE INVENTION

Alarm and security systems are now common additions to many homes and businesses. Sophisticated systems are able to communicate with a control center to alert the police, fire department, security center or a property owner. Although such systems are able to communicate an intrusion or event to some extent, the user or operator of the system is unable to visually verify what actually happened at the remote location. As such, when a false alarm occurs, the user of the system or the authority in charge must physically travel to the alarm site to verify what actually happened.

Other systems based on remote video surveillance are able to monitor remote premises, but the user of the system must, from time to time, activate a remote console to view what is happening at a remote location. For example, the user of the system may have to establish a dial-up connection across normal telephone lines. A dial-up connection may represent an additional expense, since in order to monitor the remote location, the user has to remain on line for several minutes until a video image arrives. Also, since such systems are for remote monitoring only and do not provide automated video recording, any events that they happen while waiting may be lost.

Other systems employ video cameras connected to a VCR or a VCR with a time-lapse recorder. These systems are able to record large amounts of video imagery, but the information is sequential, and retrieving the information once recorded is a tedious process since the tape must be rewound and a fast search performed to avoid missing an event. Several minutes of searching are required through all the recorded information, and once the tape reaches the end, the system stops and will not record further. Another problem with systems of this kind is that they do not provide any communications in support of remote monitoring.

More recently, more intelligent video security systems have been described which employ motion detection in hardware as well in software. Some of these systems employ local storage and communications software to connect to a centralized server. Some are able to communicate an alarm event to a monitoring center, but this is carried out across dial-up lines, and there is an expense involved in the time spent while the line is in use.

U.S. Pat. No. 5,396,284 to Freeman discloses a multiple camera system, which incorporates motion detection performed by a Central Processing Unit (CPU). Once motion is detected, the CPU sends a signal to a TDM (time-division-multiplexed) controller located at a short distance. The TDM controller switches to the camera that detected the motion, and displays the video information on a monitor and, at the same time, video information is recorded on a recording media. Since the video signal has not been digitized on the side of the TDM controller, it is clear that the recording media must be a VCR. There are no provisions for storing video information on a hard disk based system and also the video information is non-digital.

U.S. Pat. No. 5,625,410 to Washino discloses a PC based system for monitoring and storing representative images from video cameras that may be utilized for security applications or monitoring applications. This system employs a video capture card, which digitizes and compresses video information from analog or digital cameras. The system displays the video information and continuously records the compressed video information on different media such as tape, hard disk or PCMCIA, or removable hard disk. Alarm-type motion sensors are used to reconfigure the system, such as altering image size and frame rates. The system may also employ a remote server, which allows a user to monitor or continuously record video information. The preferred embodiment does not disclose a particular motion detection algorithm, however.

U.S. Pat. No. 4,511,886 to Rodriguez discloses an electronic security and surveillance system having a central monitoring station which can be located over large distance, for example across microwave links. In order to transmit the video signal over distance the video information is modulated onto a carrier.

U.S. Pat. No. 5,581,297 to Koz discloses a low-power video security system which detects motion from a single video camera, a digital compression subsystem compresses the image, and starts transmitting the compressed image over ISDN lines to a monitoring facility. Koz does not disclose a system with a plurality of cameras, nor will the system work on a network or Internet.

SUMMARY OF THE INVENTION

The present invention resides in a computerized video security and monitoring system, preferably based on a standard PC platform. The system employs video digitizing and digital I/O technology to monitor and process video information from video cameras, and ON/OFF status information from sensors to trigger alarm events, and to allow the user to receive or monitor events via a network, including the Internet. The system can be used to view past events logged in a video database, as well as to monitor live video from local or remote locations. The locations may be from anywhere in the world, provided that there is a web-browser terminal, an interactive Internet kiosk, or a PC executing the appropriate software.

The software employs camera windows that can be moved or resized to meet user's viewing needs. Video information from a single camera or from a plurality of cameras is independently digitized, scaled and displayed on different windows. Image size and selection for black and white or color may be varied according to the NTSC standard 160×120, 320×240 and 640×480. Although the source image may be digitized at a fixed rate, (i.e., 640×480), it may be scaled to fit a portion of a screen through software control.

Controls are also provided enabling the user to select different images sizes. Although the size of the digitized image is fixed, display of the image in the screen may be varied in size according to the monitor used and the number of cameras displayed. In addition, since the camera windows are resizable by the user, some windows may be larger than others. The display of the images, preferably follow a standard 4/3 aspect ratio, so when the user resizes the window, the horizontal and vertical scale ratios are maintained. All the camera windows are integrated into a single window, which incorporates a menu, tool bar and status bar. The window can also be resized allowing the user to put the mainframe window anywhere in the computer screen. This option allows the user to run programs on the same computer, while the application is running.

The digitized information from each video camera is alternatively analyzed using image processing techniques and to trigger alarm events. Other alternatives provide ON/OFF signals from devices such as infrared sensors, motion sensors, alarm signals or cameras with built-in motion detection. To sense ON/OFF signal states the software constantly monitors digital I/O logic until a signal activates, generating an alarm event. Once the alarm event occurs, the digitized camera image may then be saved in a database, or, alternatively, transmitted over a network or Internet to one or more remote locations.

When a trigger event is used to send an e-mail through the Internet, the compressed video image is preferably combined with a textual message, encoded in Internet SMTP and MIME format and sent to a mail server. In addition to e-mail, a beeper/pager may be sent to the user telling that an alarm event has occurred. Upon receiving a beeper signal, the user may enter into a mail account using a standard web-browser, and view the image or a plurality of images from different cameras.

When a trigger event occurs, digitized camera information is compressed through JPEG compression. The information is then stored on the computer hard disk in a video database and assigned a record number. The date, time and camera number is also saved as part of the same record in the database. In addition, video information is alternatively transmitted in JPEG compressed format over a network or Internet to a server, which is part of the software provided.

The server preferably incorporates a structured video database resident on a hard disk, enabling local or remote information to be retrieved through a user-friendly console that incorporates controls very similar to those of a compact disk player. Record information is retrieved, decompressed by software and displayed in a random fashion since the user can easily go to the beginning, middle, end or any other record position by moving a slider control or the use of a single step and fast search buttons. The invention is not limited in terms of video standard, and supports NTSC, PAL, SECAM, or any other cameras with higher resolutions.

It is an object of the invention to provide encryption of date, time and camera identification information, which can be incorporated in the video image itself, ensuring that the chronological time event is authentic.

Although the current embodiment runs on a PC based platform, it is another object of the invention to port the hardware and software provided to an embedded system, including audio and video capture PC interface cards designed by other manufacturers.

It is a further object of the invention to provide support for the remote monitoring of analog and digital signals. Applications may be industrial, medical, remote control, remote sensing and home automation.

DETAILED DESCRIPTION OF THE INVENTION

The present invention resides in a system wherein a plurality of video cameras may be monitored from a local or remote location. The system records video camera information in a compressed format when motion is detected either by analyzing the camera video signal or through motion detection devices. The invention provides communications allowing an operator to view and control camera information and status signals from devices from anywhere in the world, exploiting low-cost Internet resources or existing local networks. The system is also capable of advising a user when an alarm event occurs by sending a video image of the camera or a plurality of cameras, a beeper, or an auditive or textual message via any other appropriate communications means.

Figure 7:
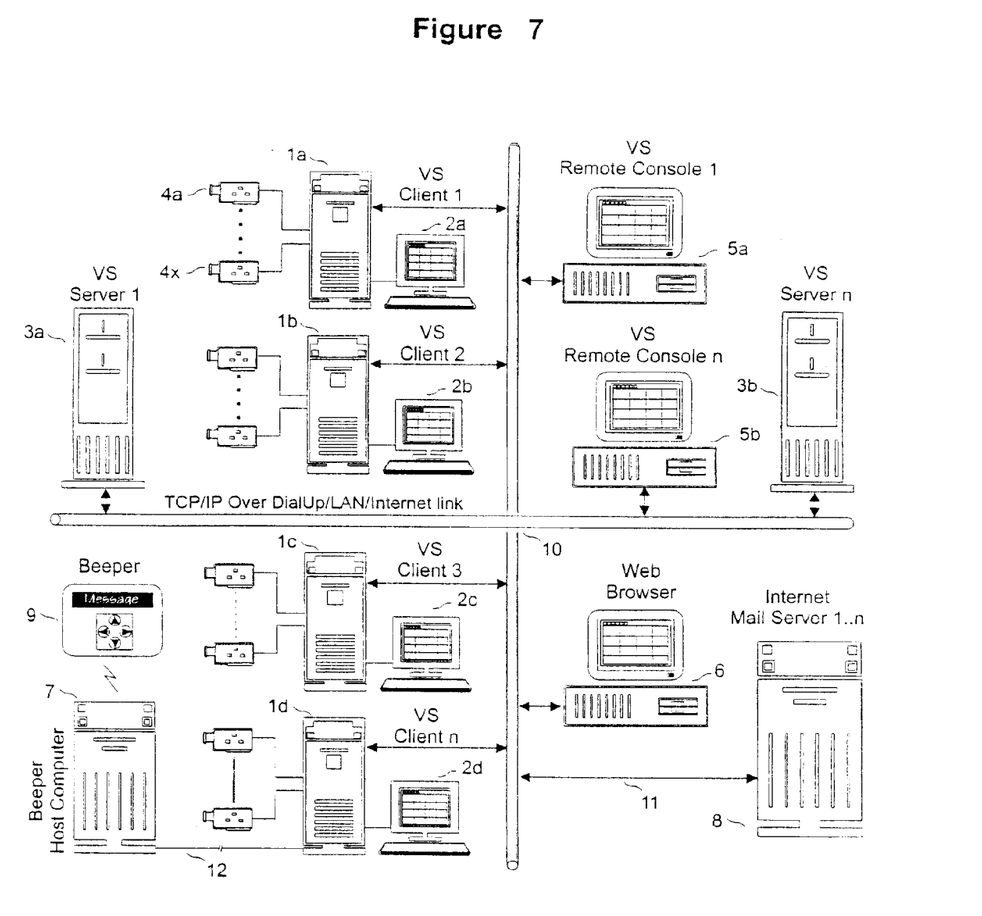
FIG. 7 shows a network of possible system configurations.

Referring to FIG. 7, the block diagram shows a network of different configurations to which the invention is applicable. The invention combines hardware residing inside systems 1a–1d, and software loaded on standard PC platforms 1a–1d, 3a–3b, and 5a–5b. Other pieces of software running on devices 6, 7 and 8 are preferably provided by different vendors.

Figure 8A:
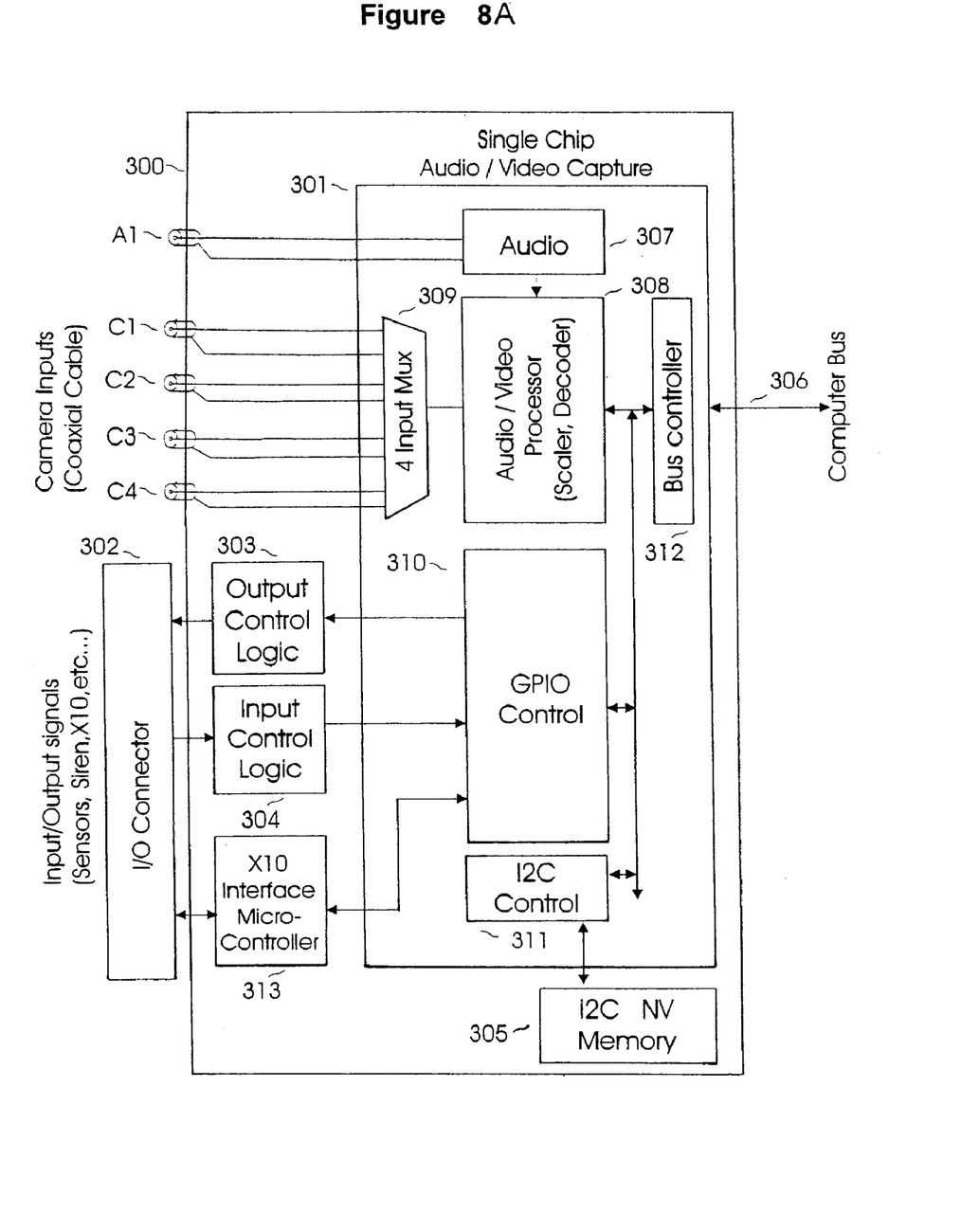
FIG. 8A is a block diagram of audio, video-capture and digital I/O cards used for digitizing camera video images and for reading input device signal status.

The software running on 1a–1d, called the VS client, controls the hardware referenced in the block diagram of FIG. 8. The software that runs on 3a–3b is named the VS server, and the software that runs on 5a–5b is named the VS remote console. The system allows for multiple configurations in which a plurality of VS clients, VS servers, VS remote consoles interact with Internet mail server 8, beeper host computer 7, and web browser terminal 6, which may exist at different physical locations, all interconnected via a network or the Internet. The network topology may be implemented across a local area network, dial-up lines, dedicated lines, cellular phones, satellite links, or any other data link supporting the Internet TCP/IP protocol.

FIG. 8A is a block diagram showing the audio, video capture and digital I/O card used by the VS client. The interface card 300 preferably uses a single chip 301 that contains audio input logic 307, a four-input video multiplexer (mux) 309, audio/video processor 308, GPIO (General Purpose Input/Output) control 310, I2C control 311 and bus controller 312. The four input video mux 309 may be controlled by software to select one video input at a time. The video processor 308 digitizes video information from the video mux 309, and outputs this digital information to the computer bus 306 across the bus controller 312.

The GPIO control 310 is a device that accepts standard TTL level input signals and generates TTL-level output signals. The output logic 303 provides four TTL level signals and four signals with the current and voltage rating to drive relays. The input logic 304 provides four TTL level signals and four optically coupled signals, which can be used to monitor signals coming from devices that are located far from the computer.

The I2C control 311 is a serial controller that communicates with serial non-volatile (NV) memories such as I2C NV memory 305. Memory 305 is used to control software piracy and maintain track and serialization of distributed installations. An encrypted serial number is recorded in the NV memory 305 during its manufacture. The I/O connector 302 is a connector that goes on the back of the computer as well as the camera inputs C1–C4 and the audio connector A1.

The X10 Interface micro-controller 313 is used to control and/or read the status of X10 devices over the AC power grid. This micro-controller runs a program to receive commands from the PC software over the GPIO and translate it to X10 commands, which are send over the AC power grid. In an alternate scenario, X10 commands coming from X10 devices are translated to commands that can be interpreted by the PC software.

In terms of functionality, video information from camera C1–C4 is fed into the video mux 309. The software consists of two independent modules or engines working in multi-threading/multi-tasking. One software module selects at different intervals one input of the mux 309 at a time, feeding the signal to the video processor 308, which digitizes the video signal and transmits the digital stream across the computer bus to the computer memory. During software initialization, each camera signal is assigned a different location in memory. Another module of the software is constantly retrieving this information from memory, displaying it on its respective position in the screen as shown in FIGS. 1–4, alternatively analyzing it for motion and transmitting it over the network as shown in FIG. 7. According to an alternate scenario, digital I/O information entering at 302 from different devices such as motion sensors, alarm signals, door switches or cameras with built-in motion sensors, is level sampled across devices 304 and 310, and transmitted over the computer bus 306 to computer memory. These level signals are flags that tell the software if a device has been activated or not. Upon receiving such signal, the software decides whether or not to activate an alarm event.

Figure 8B:
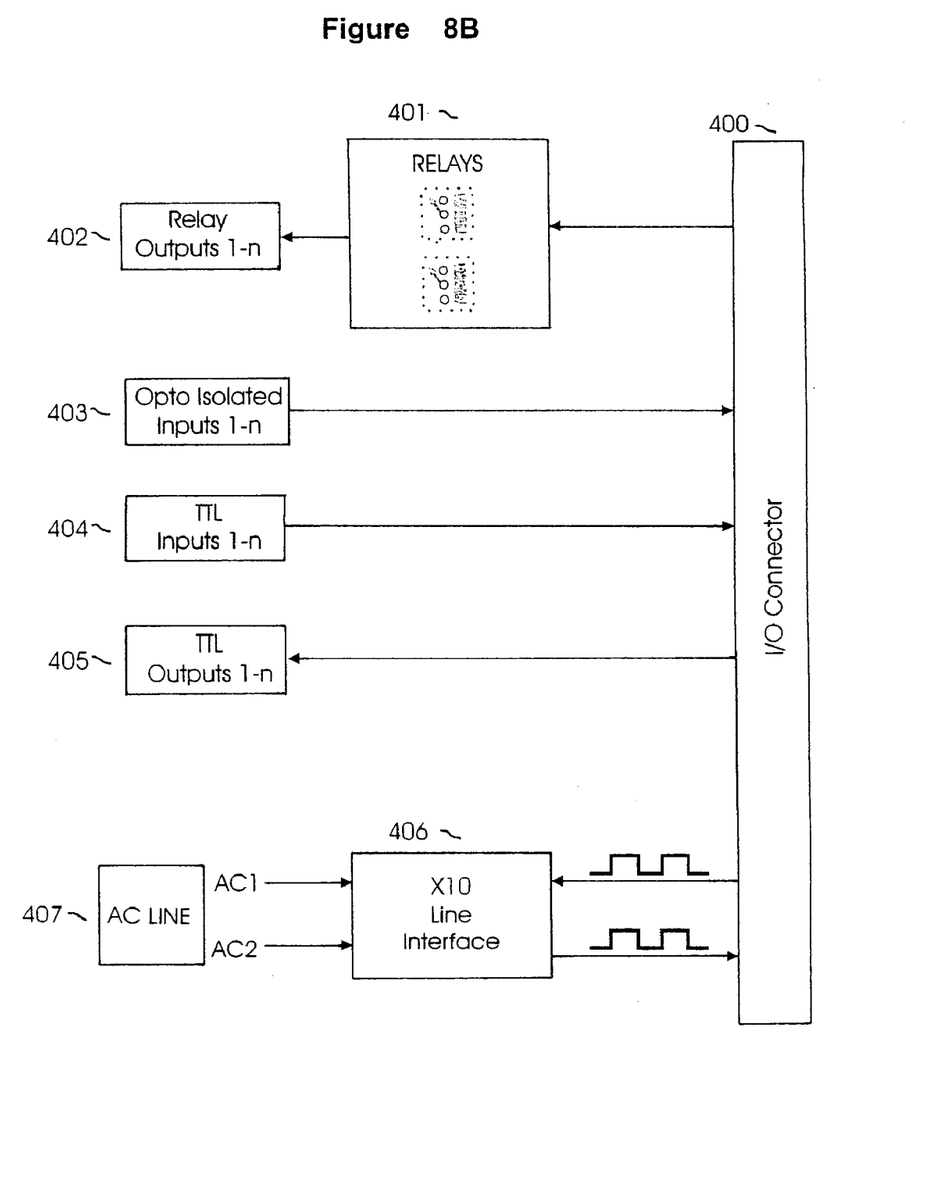
FIG. 8B is a block diagram of the I/O connector showing interface signals used to connect to external input and output devices.

FIG. 8B is a block diagram showing the different signals levels and signal formats that can be interfaced to the I/O connector 400 (item 302 in FIG. 8A). The I/O connector provides signals with the voltage and current levels to drives relays 401 which can be used to control any isolated system connected across 402, including alarm systems, sirens, lamps or any other device to be controlled.

Input devices such as motion sensors and switches may be monitored across the optically isolated inputs 403 or over the TTL inputs 404. In addition, TTL outputs 405 can be used to control other devices directly or through the addition of a high-current driver. The X10 AC line interface 406 is a unit manufactured by X10 (USA) Inc. The unit converts TTL level commands from the micro-controller depicted as 313 in FIG. 8A into a modulated 125 KHZ carrier signal that is transmitted over the AC power line 407. This unit also detects the zero level crossing of the AC power line 407 allowing the micro-controller to synchronize its transmission when the voltage level on the AC power line 407 is near zero.

Figure 9A:
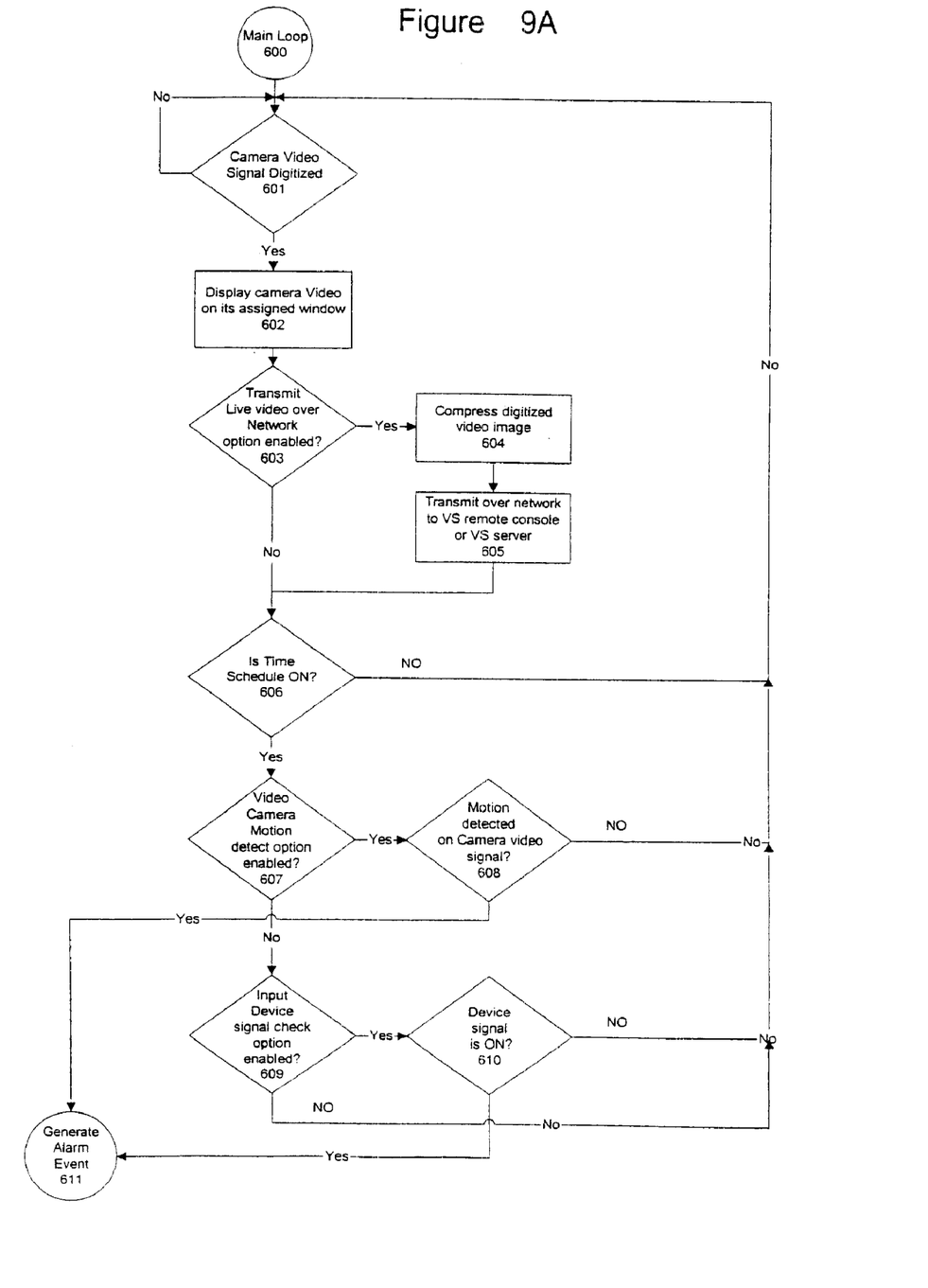
FIG. 9A is a block diagram of a first portion of the software for a system according to the invention.
Figure 9B:
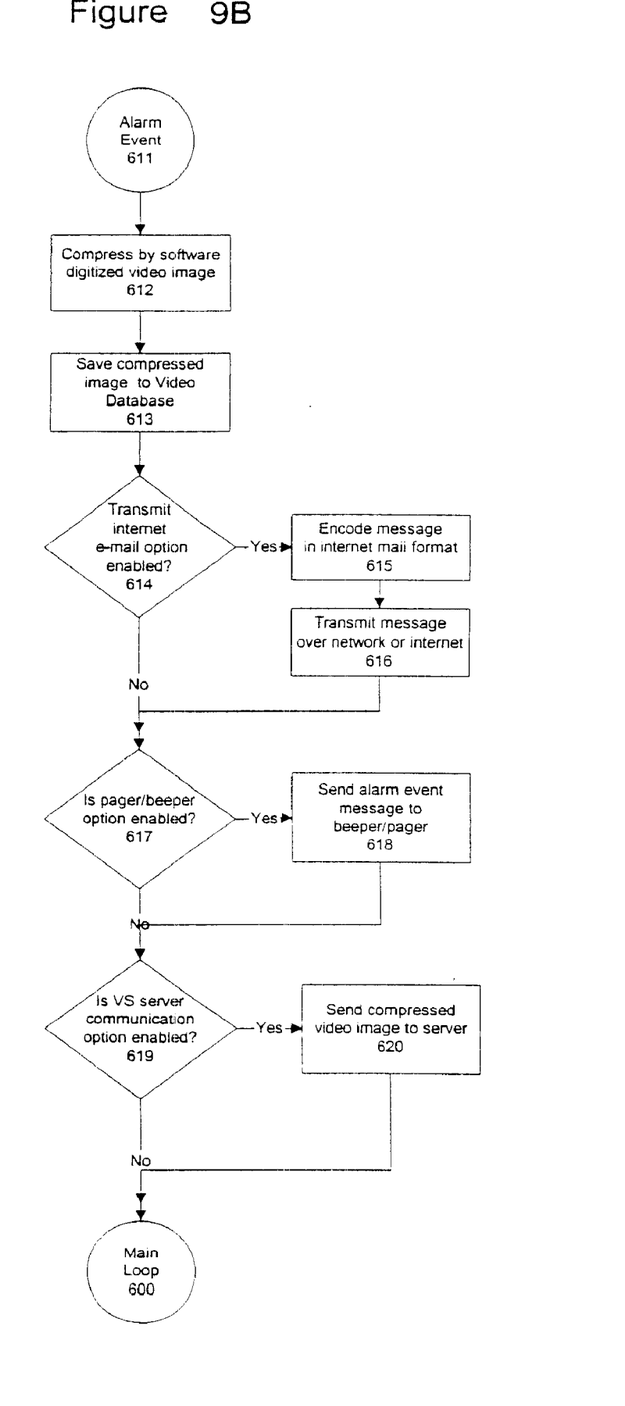
FIG. 9B is a block diagram of a second portion of the operating software.

FIGS. 9A–9B present a functional flow chart of the operation of the software of the VS client la-id (FIG. 7). Since the system has many configurable options, it is easier to functionally view how the software behaves, under different configurations. After the software initializes, it enters the main loop 600. Once a camera video signal is digitized at 601, the digitized image is displayed on the screen on its assigned camera window. If the VS client is connected to a network and the transmit option is enabled at 603, the digitized camera video image is compressed by software 604, and sent to the VS server 3a–3b (FIG. 7) or to a VS remote console 5a–5b (FIG. 7).

The software incorporates a time schedule allowing the user to select the surveillance period. If the time schedule period is not ON (606), the software does not perform any other checking, returning to the main loop at 600. However if the time schedule period is ON, the software then checks if camera motion detect option is enabled at 607. If camera motion detect is enabled and motion is detected on the camera video signal 608, the software generates an alarm event 611. At 607, if the camera motion detect option is not enabled, the software checks if the device signal check option is enabled 609. If any of the devices are connected to the input logic 302 and 304 (FIG. 8), and the signal is in the ON condition, an alarm event 611 is generated.

Now referring to FIG. 9B, when an alarm event occurs at 611, the digitized camera video image is compressed at 612, and saved on a hard disk based video database 613. If the Internet mail option is enabled 614, the compressed video image is encoded in the standard SMTP and MIME Internet format 615 along with a textual message, then transmitted at 616 to an Internet mail server or network based mail server. If the beeper/pager option is enabled 617, a message is sent 618 to the beeper/pager unit. When the user receives the beeper/pager message, a standard web browser can be opened to retrieve the message with the attached video camera image from a mail account, for example. At step 619, if the VS server option is enabled, the compressed video image is sent to the VS server 620, and then the software continues again with the main loop 600, as shown on top of FIG. 9A.

Figure 1:
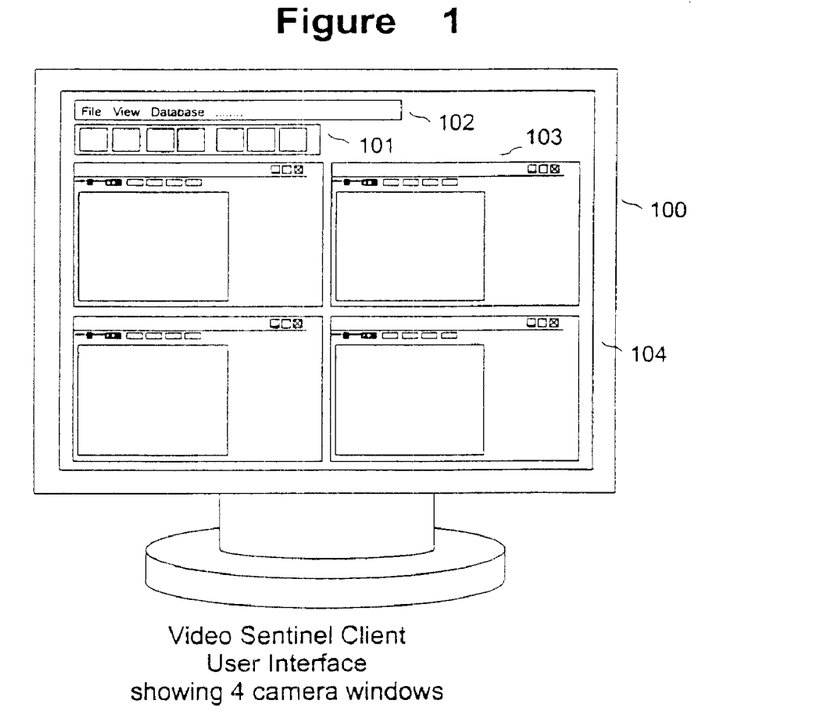
FIG. 1 is a screen display showing four camera windows according to the invention.

FIG. 1 shows a screen display 104 for four cameras. The window 104 varies in size with the monitor 100 and the type of video interface card being used. Regardless of what type of monitor is used, the operating system automatically adjusts the size of the window 104. Most windows based operating systems today employ this kind of functionality. Although the preferred embodiment is based on the Microsoft Windows operating system, the invention may use any commercially available operating systems as they evolve, including Linux. The window holds three main components: main menu 102, toolbar 101, and the camera windows 103. The main menu 102 allows the user to set all the configurable options of the system. The toolbar 101 allows the user to turn ON/OFF, arrange, resize and optimize in the mainframe window 104 the camera windows and to stop/start the video surveillance.

Figure 2:
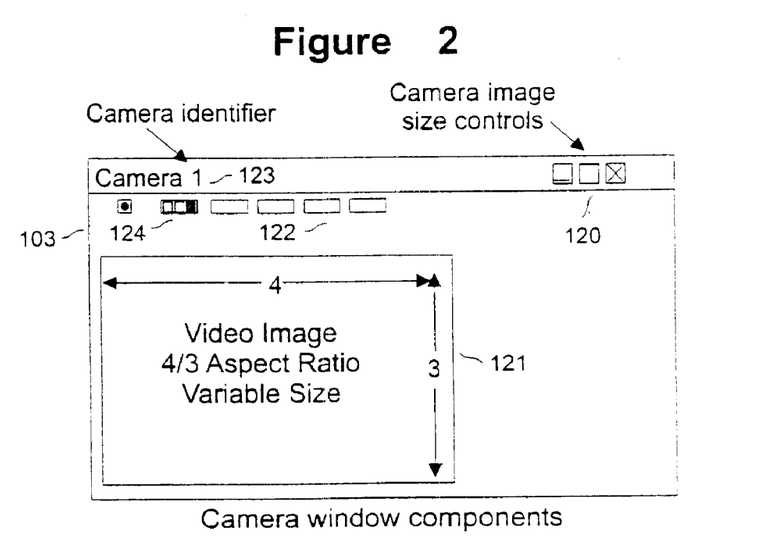
FIG. 2 illustrates the camera window components for a particular screen format.

FIG. 2 is a zoom of the camera window format (103 of FIG. 1). The main window components are the camera image size controls 120, camera video image 121, status indicators and control icons 122, and the camera identifier 123. The image size controls 120 are used to minimize, maximize and close the camera window. The window can also be resized by the user, by clicking with the mouse the corners of the window and pulling inward or outward. Camera video image 121 dynamically adjusts whenever the user adjusts the window 103, though an aspect ratio of 4/3 is preferably maintained.

The computer automatically determines the optimal size of the camera window 121 whenever the user resizes window 103. The status indicators 124 display the status of the camera, if the camera is turned OFF or ON, or if motion is detected from the camera. The control icons 122 allow the user to adjust the settings for an individual camera, such as camera video motion detect sensitivity, video brightness and contrast adjust, and the image area of surveillance.

Figure 3:
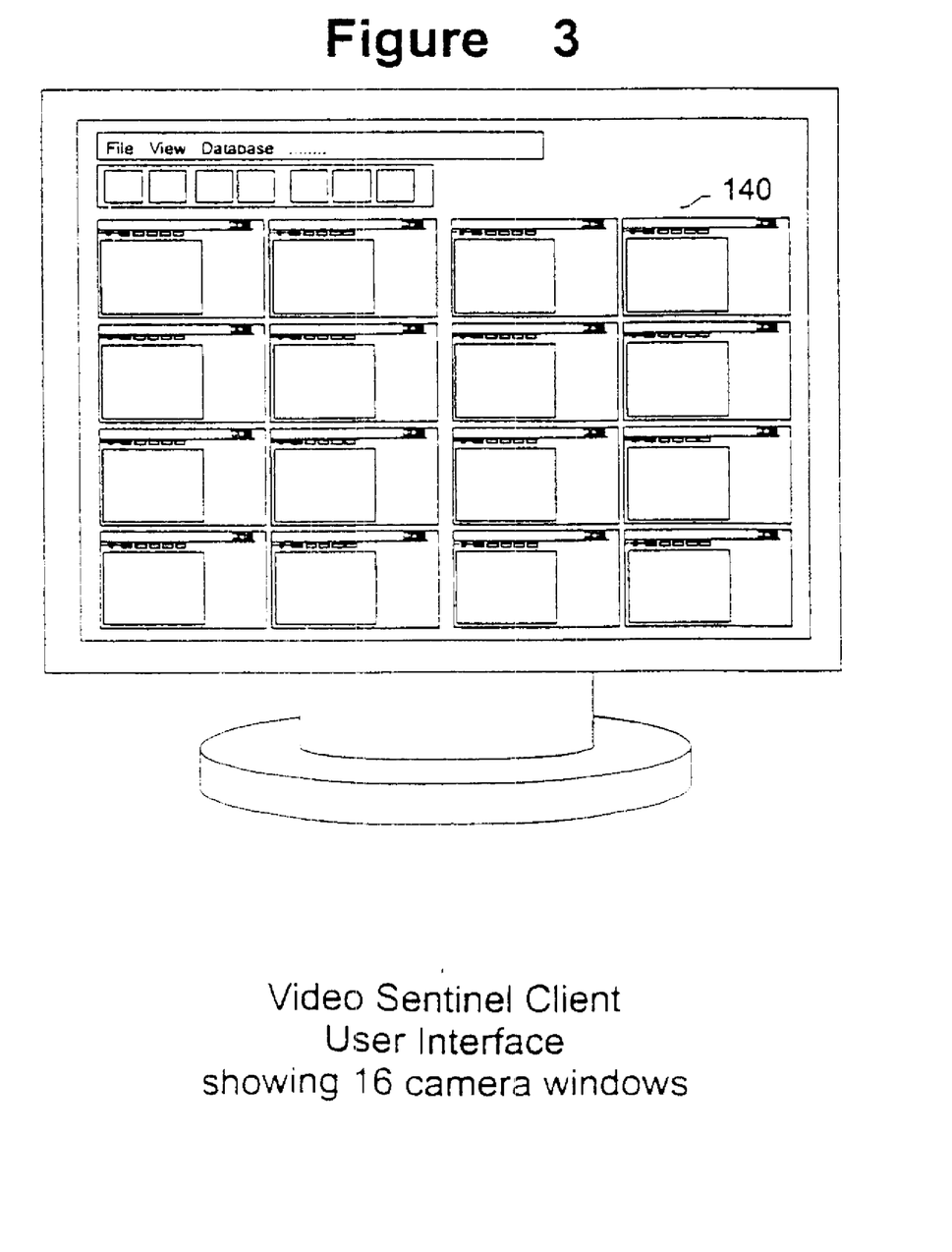
FIG. 3 illustrates an alternative screen display showing 16 camera windows.

FIG. 3 shows a display with 16 cameras and the arrangement of the windows in the screen. Once the program is started, the system finds the optimal size for each camera window and accommodates all the windows inside the mainframe window. Other configurations between 1 and 16 cameras are possible. The position and size of each window is always under operating system control unless the user manually resizes or moves the camera windows or uses any of the controls of the toolbar. Depending on the camera number used (1–16), the operating system accommodates the camera windows inside the hardware platform in order to optimize its size. The viewing window can also be resized or moved across the screen, in which case the camera windows are automatically resized and repositioned by the operating system.

Figure 4:
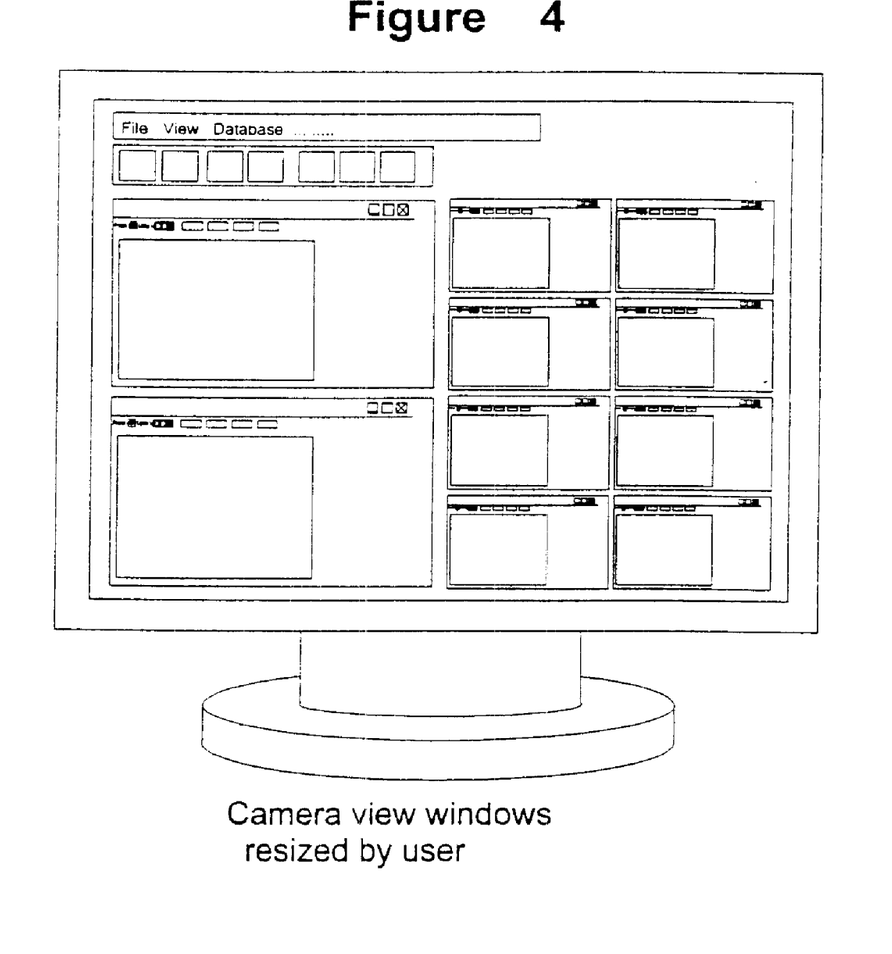
FIG. 4 illustrates an alternative configuration wherein the windows have been resized by a user.
Figure 5:
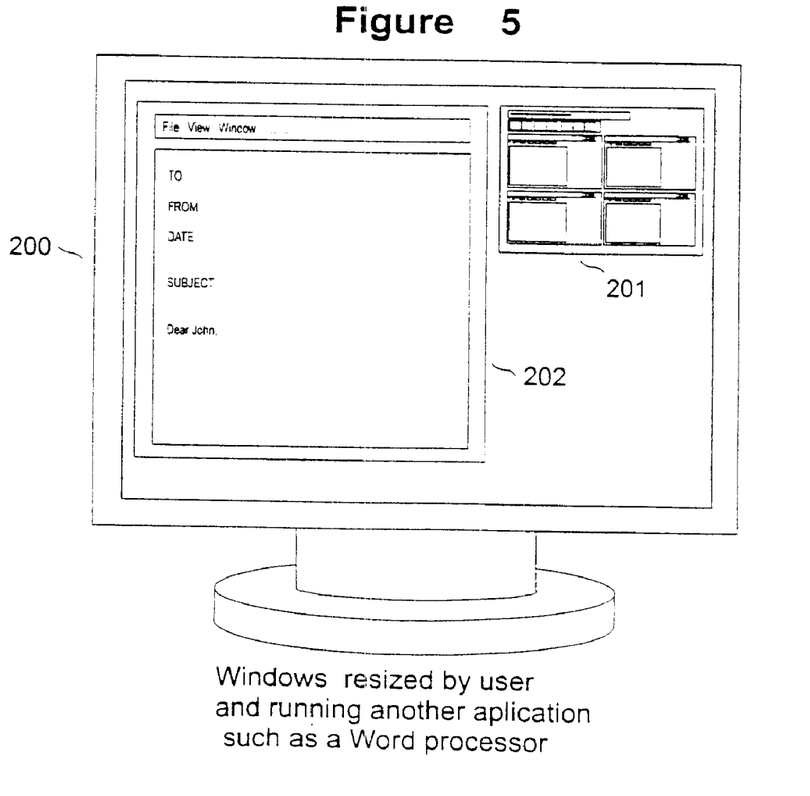
FIG. 5 shows a screen format wherein software is provided while running another application.

FIG. 4 shows an example of a 10-camera system. Two of the camera windows have been resized by the user to obtain a better view of the camera images, while the other 8 cameras, presumably less important, have an smaller size. FIG. 5 shows an example in which a window 201 has been resized and moved to the upper right corner of the screen in order to run another application 202, in this case a common word processor. Such an application may be used in company lobbies, where the receptionist may use a word processor or another application, while the system is doing video surveillance in the background, with the system automatically recording any alarm events that may occur in the video database.

Figure 6:
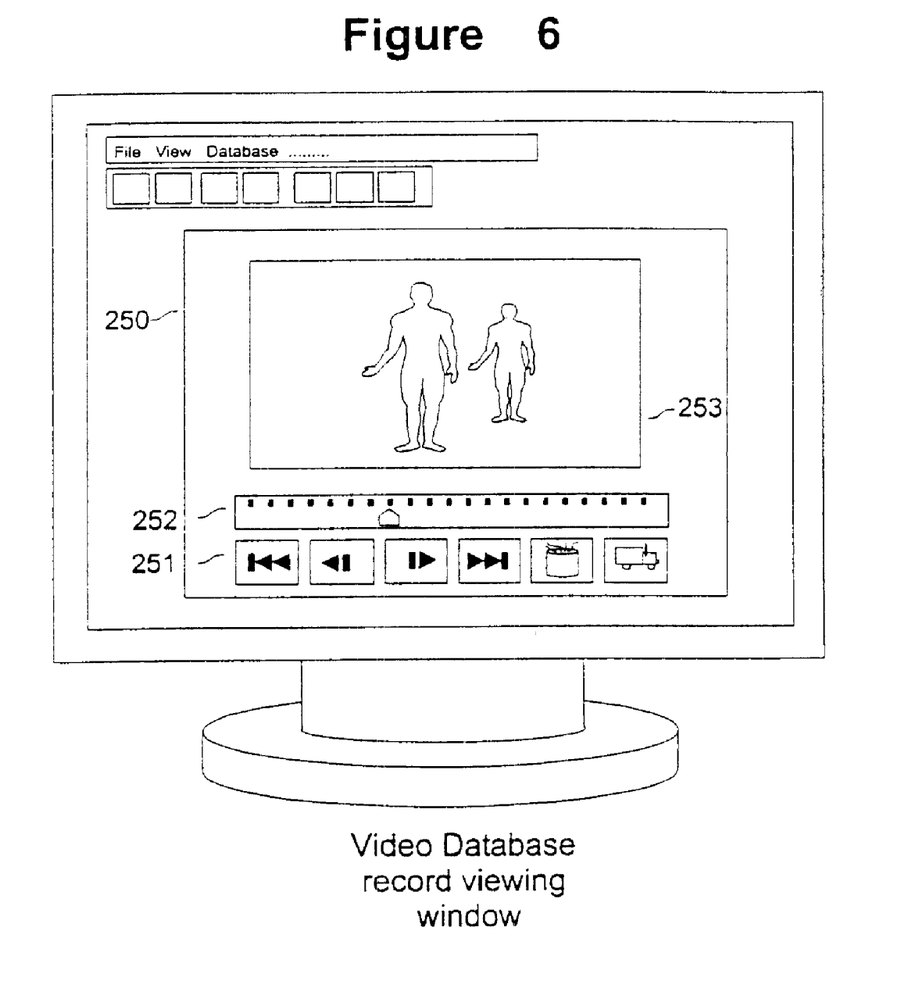
FIG. 6 shows the screen format for viewing records from a video database.

FIG. 6 shows the format of the record viewing console 250, showing the video database fast search controls. The compact disc like controls 251 are used to do single-step back and forward searching and to jump to the beginning or end of the video database. The slider control 252 is used also to position the record pointer anywhere in the video database for faster search. Controls are also provided to delete and export records. Any records retrieved from the video database are decompressed and displayed on the window 253.

Figure 9C:
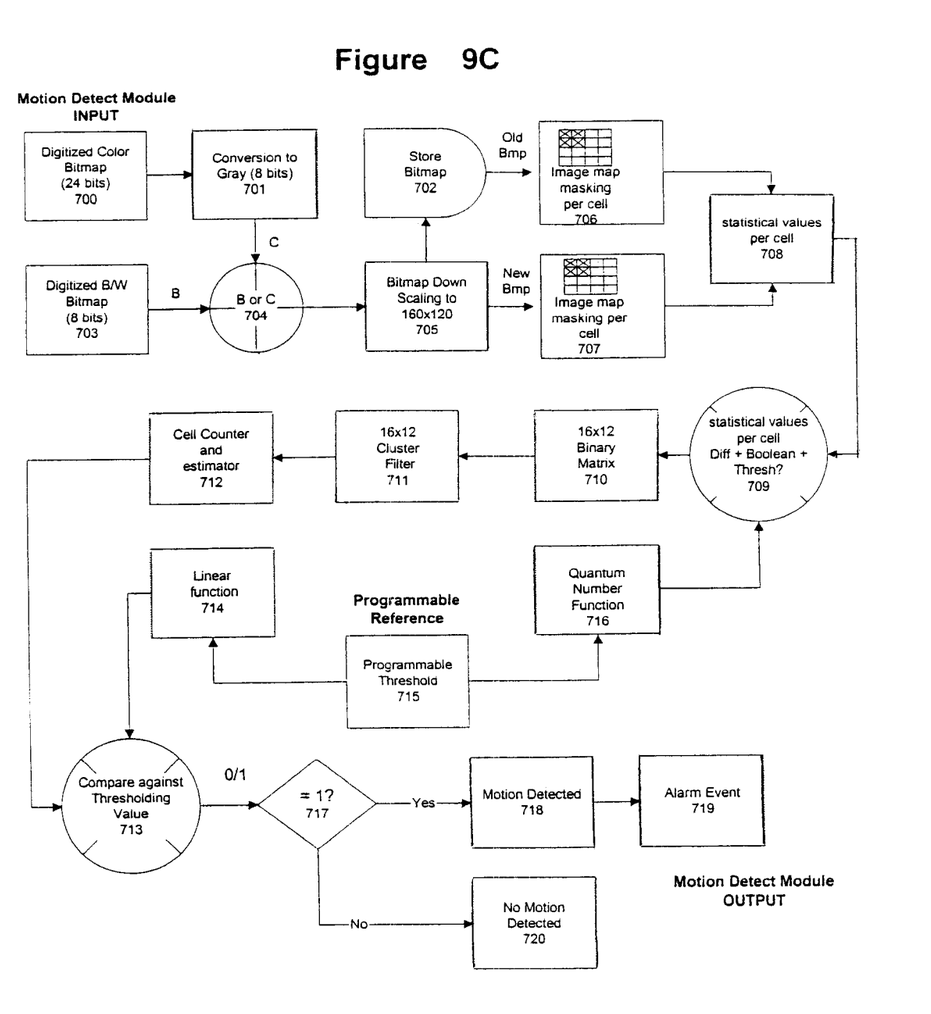
FIG. 9C is a block diagram of the operation of the camera video motion detection module.

FIG. 9C is a detailed block diagram of the motion detect algorithm employed to detect motion from the video cameras. The algorithm uses a compare last frame versus the new frame obtained from a video camera, each camera independently and at different time periods. The last frame for each video camera is therefore kept in memory at separate memory locations. In addition, the software provides a graphical user interface allowing the user to make certain areas of the video camera image insensitive to motion. This is done by dividing the entire video image screen into multiple cells of size 10×10. Once the user selects from the screen the cells sensitive to motion an image map is saved on disk for each camera independently. When the software starts the image map is loaded in memory for each camera independently to do real-time image masking.

The motion detection algorithm can process information coming from a digitized color bitmap 700 or a digitized gray level bitmap 703, at different frame sizes such as 320×240 or 640×680. When the digitized bitmap is a color bitmap 700, a conversion to gray level is done leading to a bitmap identical to a digitized gray level bitmap 703. The gray level bitmap 704 is then scaled down (705) to a preferred embodiment fixed format 2D (two dimensions, x and y) matrix of 160×120. This process is done to increase computational speed by 4 times. Although the preferred embodiment is a 2D 160×120 matrix, other scaling factors such as 80×60 may be employed according to the application to further increase processing speed.

Statistical values 708 are obtained from the old bitmap 2D matrix 706 and the new bitmap 2D matrix 707 on a cell-by-cell basis, excluding those cells that are masked by the image map. The absolute value of the difference of these statistical values is then computed, and compared against a threshold value, which is obtained from a logarithmic quantum number function 716. A Boolean comparison is then made in which a certain logical combination of the set of statistical values occurs, produces a binary number (0 or 1). If the result of the binary comparison 709, is a logic 1, it implies that the cell changed for some reason. The reasons may be due to noise or that the portion of the image really changed do to a moving object. A binary value for each cell is stored in a binary 2D matrix 710 of 16×12.

A cluster filter 711 is applied to the 2D binary matrix 710, in which a matrix element with a binary one value that is not spatially surrounded by other matrix elements is assigned a value of zero. This filter behaves much like a spatial noise filter, in which only those matrix elements that are clustered together remain unchanged, constituting a bounded object or a group of bounded objects. This bounded object or group of bounded objects is obviously a moving object since it is the result of the change of the statistical values when comparing the previous frame with the new frame and in which noise has been eliminated.

The cell counter and percent estimator 712 scans the remains of the 2D binary matrix 711, counting how many matrix elements have a binary value of one. Since the number of elements is a fixed value (16×12=192), the number of matrix elements multiplied by 100 and divided by 192 will give the percentage of cells in which motion has been detected. The number obtained by operation 712 is then compared on 713 against the threshold number derived by the combination of the linear function 714 and the user configurable threshold 715. If no motion is detected 720, the software proceeds as normal, perhaps checking the next camera for motion. If the output of 713, is a logic one 717, then motion has been detected 718, leading to an alarm event 719. Once the alarm event is generated 719, the software then proceeds as shown in step 611 FIG. 9B.

We claim:

1. A video monitoring system, comprising:

a plurality of video cameras, each outputting a video image;

a personal computer interfaced to each camera, a display device, video digitization circuitry and an event trigger, the computer being operative to perform the following functions:

a) receive and digitize the video images from each video cameras, b) display the video images in separate windows on the display device, and c) perform a predetermined function in response to the event trigger, wherein the event trigger is generated by:

applying a map having a plurality of masking cells to a new video image and to an old video image so that the new video image and the old video image each include a plurality of unmasked cells completely surrounding the masked cells, wherein the map has the same dimensions as the new video image and the old video image, and wherein the masked cells inactivate a fixed area within the new video image and the old video image, comparing the plurality of unmasked cells of the new video image with the plurality of unmasked cells of the old video image to detect any changed cells in the new video image, and applying a filter to the changed cells that eliminates any changed cells in the new video image that are not surrounded by other changed cells in the new video image, and wherein the event trigger is generated when at least one changed cell remains after applying the filter.

2. The video monitoring system of claim 1, further including an alarm system or motion sensor operative to generate the event trigger.

3. The video monitoring system of claim 1, further including video storage means, and wherein the predetermined function includes digitally compressing and storing the video images from at least one of the cameras.

4. The video monitoring system of claim 3, wherein the computer is further operative under user control to display the video information recorded in the video storage means.

5. The video monitoring system of claim 1, further including a network interface, and wherein the predetermined function includes digitally compressing and communicating the video images from at least one of the cameras to a remote location.

6. The video monitoring system of claim 5, wherein the network interface includes an Internet connection.

7. The video monitoring system of claim 6, wherein a user is operative to view the video images at a remote location in separate windows using a web browser.

8. The video monitoring system of claim 5, further including a second personal computer interfaced to a second display device at the remote location, and wherein a user at the second location is operative to view the video images in separate windows on the second display device.

9. The video monitoring system of claim 1, further including an interface to a pager, and wherein the predetermined function includes alerting a user equipped with the pager.

10. The video monitoring system of claim 1, further including an interface to a telecommunications network, and wherein the predetermined function includes alerting a user through a telephone call.

11. The video monitoring system of claim 1, including a non-volatile memory encoding an encrypted license to prevent software piracy.

12. The video monitoring system of claim 1, further including means to monitor audio from a local or remote location.

13. The video monitoring system of claim 1, wherein the video digitization circuitry is operative to independently capture, process and display video information received from each camera.

14. The video monitoring system of claim 1, wherein the computer is further operative to display multiple independent views from each camera, and wherein each view may be resized or moved under user control.

15. The video monitoring system of claim 1, wherein the computer is further operative to independently configure each video cameras by performing one or both of the following functions:

a) displaying one or more icons enabling a user to capture a single frame from the video camera, and b) displaying one or more icons enabling a user to control video sensitivity and image area.

16. The video monitoring system of claim 1, wherein the computer is further operative to display status information relating to each video camera.

17. The video monitoring system of claim 1, further including an output operative to control an external device in response to an event trigger.

18. The video monitoring system of claim 17, wherein the device is an alarm system, a visual indicator, or an audible indicator.

19. The video monitoring system of claim 1, further including an output operative to control an external device through an AC power line.

20. The video monitoring system of claim 1, wherein the computer is further configured to receive a signal from an external alarm sensor and to generate the event trigger based upon a signal from the alarm sensor or when the at least one changed cell remains after applying the filter.

21. The video monitoring system of claim 1, wherein the predetermined function comprises initiating compression and recording of a digitized video image from a video camera associated with the event trigger.

22. The video monitoring system of claim 21, wherein the compression comprises compression according to a standard Internet format, and wherein predetermined function further comprises transmitting the compressed video image as part of an electronic message.

23. The video monitoring system of claim 1, wherein the filter is further configured to eliminate any changed cells that are not surrounded by changed cells.

24. The video monitoring system of claim 23, wherein the event trigger is generated when the number of changed cells remaining after applying the filter exceeds a threshold.

25. The video monitoring system of claim 24, further comprising a video capture card connected between the plurality of video cameras and the personal computer, wherein the video capture card comprises:

a plurality of analog inputs configured to receive a video signal representing the video image;

a digitizer operationally coupled with the plurality of analog inputs and configured to generate a digital signal based upon the video signal;

a bus controller operationally coupled with the digitizer and configured to provide the digital signal to the computer;

an input-output controller operationally coupled with the bus controller and configured to receive commands from the computer, and wherein the commands provide output signals for controlling external devices in response to the event trigger, and further configured to receive at least one signal from an external device and to direct the computer to generate the event trigger based upon the at least one signal.

26. A video monitoring system especially suitable to monitor the security of a facility against an intrusion, comprising:

at least one video camera that generates a video signal;

a computer operationally coupled with the at least one video camera and configured to receive the video signal, wherein the video signal includes a plurality of frames each having a plurality of cells, and wherein the computer is configured to perform the following functions:

detect motion as between a first and a second frame of the video signal by comparing a plurality of the cells of the first frame to a plurality of the cells of the second frame, wherein the plurality of cells of the first and second frames exclude a user-defined insensitive area, which is completely surrounded by an active area containing the plurality of the cells of the first and second frames;

automatically transmit an electronic message upon detection of the motion wherein the electronic message includes a recorded and compressed copy of the video signal beginning approximately coincident with the detection of motion; and automatically transmit an alarm message separate from the electronic message that alerts a user of the electronic message.

27. The video monitoring system of claim 26, further comprising:

a pager output configured to alert a user upon detection of motion; and an external output configured to activate a local alarm device; and wherein the computer is further configured to apply a cluster filter to the comparison between the cells of the first and the second frame that eliminates any changed cells that are not adjacent to other changed cells, and to determine whether the number of changed cells remaining after the cluster filter exceeds a threshold; and wherein the video signal comprises a single frame.

28. A method of monitoring a facility, comprising the steps of:

receiving a video signal from a first video camera positioned to monitor a specific area, wherein the video signal is divided into a plurality of sequential frames each having a plurality of cells;

applying a mask having active and inactive cells to the sequential frames of the video signal, wherein the inactive cells are surrounded by the active cells, and wherein the mask has the same number of cells as the video signal;

comparing the active cells of a new frame to the active cells of a previous frame to detect changed cells, wherein an alarm event is generated based upon the detection of changed cells;

recording the video signal as a file stored in a computer memory based upon the alarm event;

automatically transmitting the recorded video signal based upon the alarm event as a part of an electronic message to an electronic mail server, where the recorded video signal is then stored; and transmitting an alarm message separate from the electronic message that alerts a user of the alarm event.

29. The method of monitoring a facility of claim 28, wherein the step of receiving the video signal further comprises receiving a plurality of video signals from a plurality of video cameras each positioned to monitor a plurality of specific areas.

30. The method of claim 28, wherein the step of apply a mask having active and inactive cells to the sequential frames of the video signal further comprises applying a plurality of masks, each associated with one of the plurality of video cameras, to the video signal.

31. The method of claim 30, wherein step of comparing the active cells of the new frame to the active cells of the previous frame to detect changed cells, further comprises applying a cluster filter to eliminate changed cells that are not adjacent to other changed cells, and wherein the alarm event is generated based upon the detection of changed cells remaining after application of the cluster filter.

32. The method of claim 31, wherein the step of recording the video signal as the file stored in the computer memory based upon the alarm event is initiated by the alarm event.

33. The method of claim 32, wherein the step of transmitting the recorded video signal as a part of an electronic message to an electronic mail server, further comprises compressing the recorded video signal in accordance with a standard Internet format.

34. The method of claim 33, wherein the step of transmitting the recorded video signal as part of an electronic message further comprises transmitting the electronic message to a network server, wherein the network server is configured to provide the recorded video signal at a global network address.

35. The method of claim 33, wherein the step of transmitting the separate alarm message that alerts the user of the alarm event comprises transmitting a beeper message.

36. The method of claim 33, further comprising the step of accessing the recorded video signal through a browser from a physical location that does not have a dedicated connection to a computer system associated with the video cameras.

37. The method of claim 29, further comprising the step of receiving commands from a user that define the boundaries between the active and inactive cells of the mask so that the user may render a portion of the video signal insensitive to motion.

* * * * *